(12) United States Patent
Iwaguchi et al.

(10) Patent No.: US 6,450,405 B1
(45) Date of Patent: Sep. 17, 2002

(54) OPTICAL CODE READER USING BINARIZATION CIRCUIT AND BINARIZATION CIRCUIT

(75) Inventors: Isao Iwaguchi; Hiroaki Kawai; Mitsuo Watanabe; Kozo Yamazaki, all of Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 0 days.

(21) Appl. No.: 09/453,572

(22) Filed: Dec. 2, 1999

(30) Foreign Application Priority Data

Jul. 15, 1999 (JP) .......................................... 11-201639

(51) Int. Cl.[7] .......................... G02B 26/10; G06K 7/10; G06K 9/22; G06K 19/06
(52) U.S. Cl. ............................. 235/462.25; 235/462.12; 235/462.17; 235/467.19
(58) Field of Search ..................... 235/462.25, 462.37, 235/462.28, 462.12, 462.17, 462.19

(56) References Cited

U.S. PATENT DOCUMENTS

| | | | | |
|---|---|---|---|---|
| 4,672,682 A | * | 6/1987 | Naruse et al. ............... 358/464 |
| 4,975,897 A | * | 12/1990 | Tanahashi ..................... 360/46 |
| 5,068,520 A | * | 11/1991 | Sato ....................... 235/462.27 |
| 5,142,130 A | * | 8/1992 | Sato ............................ 235/436 |
| 5,163,003 A | * | 11/1992 | Kimura ......................... 360/45 |
| 5,448,078 A | * | 9/1995 | Nakazawa ............. 250/559.24 |
| 5,491,330 A | * | 2/1996 | Sato et al. ................... 235/470 |
| 5,811,782 A | * | 9/1998 | Sato et al. ............. 235/462.01 |
| 5,898,654 A | * | 4/1999 | Shimada et al. .......... 369/44.32 |
| 5,932,861 A | * | 8/1999 | Iwaguchi et al. ............ 235/455 |
| 5,965,864 A | * | 10/1999 | Iwaguchi et al. ............ 235/454 |
| 5,999,130 A | * | 12/1999 | Enomoto ................ 369/124.13 |
| 6,160,776 A | * | 12/2000 | Seo .......................... 369/275.4 |
| 6,247,646 B1 | * | 6/2001 | Iwaguchi et al. ....... 235/462.04 |

FOREIGN PATENT DOCUMENTS

JP            407262564 A    * 10/1995

* cited by examiner

*Primary Examiner*—Michael G. Lee
*Assistant Examiner*—Daniel Walsh
(74) *Attorney, Agent, or Firm*—Armstrong, Westerman & Hattori, LLP

(57) ABSTRACT

A differentiation signal DF differentiated by a differentiation unit is inputted to a slice level generation unit and to comparators. A first peak-hold circuit and a voltage division circuit generate a slice level having a slice ratio SLR that is constant to a peak value $V_{DF}$ of the differentiation signal DF. A second peak-hold circuit generates a slice level the slice ratio SLR of which changes in accordance with the peak value $V_{DF}$. The slice level generation unit outputs their synthetic slice level SLL, which is compared by the comparators with the level of the differentiation signal DF, outputting thereby binarized signals W-GATE and B-GATE. When the level of the differentiation signal DF is high, the slice level SLL approaches the peak value $V_{DF}$. Therefore, noise components contained in the differentiation signal DF cannot exceed the slice level SLL. When the level of the differentiation signal DF is low, the slice level SLL has a constant ratio to the peak value $V_{DF}$. Consequently, the peak value of the amplitude of the differentiation signal DF can be detected reliably.

12 Claims, 14 Drawing Sheets

SLICE RATIO SLR AT t = 0S = $\dfrac{V_{SL(0S)}}{V_{DF}}$

SLICE RATIO SLR AT t = 2 μs = $\dfrac{V_{SL(2S)}}{V_{DF}}$

Fig.12 SLICE-DIFFERENTIATION SIGNAL PEAK VALUE CHARACTERISTICS

OPTICAL CODE READER USING BINARIZATION CIRCUIT AND BINARIZATION CIRCUIT

BACKGROUND OF THE INVENTION

1. Field of the Invention

This invention relates to an optical code reader that utilizes a binarization circuit for binarizing an inputted electric signal, and the binarization circuit.

2. Description of the Related Art

A bar code reader is known as a typical optical code reader. The bar code reader scans a bar code comprising a plurality of white and black bars with laser beams. When the beams reflected from the bar code are converted to electric signals, binarized signals of high and low levels can be acquired. The bar code reader decodes the content of the bar code on the basis of these signals. Besides the bar code reader, optical code readers containing such a binarization circuit include an image scanner, an OCR, a FAX, and so forth.

In the bar code readers according to the prior art, resolution drops if the beam diameter of the laser beam is greater than the width of each bar of the bar code. In this case, it is difficult to obtain the binarized electric signals that are clearly distinguished into the high and low levels. Therefore, it has been the customary technology to differentiate the electric signals acquired from the reflected beams from the bar code, to compare the signals so differentiated with a reference level (or a slice level), and to thus binarize the electric signals.

FIG. 1 shows a circuit construction for executing a binarization process in a bar code reader according to the prior art.

When a scanning mechanism 11 scans a bar code 13 with laser beams 12, a reflected beam attains a high level when the beams 12 scan white bars and falls to a low level when they scan black bars. A pin photodiode 16 receives the reflected beams and outputs electric signals in accordance with these levels.

FIG. 2 shows the relationship between the bar code and the electric signal as the output of the pin photodiode. When the beams 12 scan the bar code 13 printed on a sheet 17 from the left to the right in the drawing, the output waveform of the pin photodiode 16 rises to the high level when the beams 12 scan the white bars 14, and falls to the low level when the beams scan the black bars 15.

Turning back to FIG. 1, the electric signal is amplified by an amplification unit 21 and is differentiated by a differentiation unit 22. The differentiation signal DF so obtained exhibits a large positive value when the edge of the white bar 14 is detected, and a large negative value when the edge of the black bar 15 is detected.

A peak-hold circuit 27 inside the slice level generation unit 25 holds the peak value $V_{DF}$ of the differentiation signal DF. A voltage division circuit 29 executes voltage division of the level of this peak value $V_{DF}$ at a predetermined ratio, and generates the slice level SL. The slice level SL is inputted to a first comparison circuit 23 and is then compared with the differentiation signal DF. A slice level –SL, that is generated by inverting the polarity of the slice level SL by an inverter 37, is inputted to a second comparison circuit 24 and is compared with the differentiation signal DF.

When the level of the differentiation signal DF becomes higher than the slice level SL, the first comparison circuit 23 outputs a gate signal W-GATE. When the level of the differentiation signal DF becomes higher than the slice level –SL, the second comparison circuit 24 outputs the gate signal B-GATE. These gate signals W-GATE and B-GATE are utilized as the gate signals of a circuit that detects the edge of the white bar 14 or the edge of the black bar 15.

The bar code 13 is not always printed on the sheet surface 17 having a flat surface, as shown in FIG. 2. If the sheet surface is the surface of an egg carton, for example, the level of the reflected beam changes depending on the ruggedness 18 as the laser beams 12 scan the ruggedness 18 of the sheet surface 17. This change results in the noise in the output signal of the pin photodiode 16. This noise exhibits a greater level when the beams scan the white bar 14 than when they scan the black bar 15.

FIG. 3 shows the output waveform of each portion of the circuit shown in FIG. 1.

The output signal of the amplification unit 21 greatly changes at the edge portion of the boundary between the white bar 14 and the black bar 15. Therefore, the differentiation signal DF exhibits a large peak value $+V_{DF}$ at the edge portion of the white bar 14 and a large peak value $-V_{DF}$ at the edge portion of the black bar 15. The positive slice level signal +SL and the negative slice level –SL have a predetermined ratio to the positive peak value +V, and attenuate at a predetermined time constant with the passage of time.

When the level on the positive side of the differentiation signal DF becomes higher than the slice level +SL, the gate signal W-GATE is outputted. When the level on the negative side of the differentiation signal DF becomes higher than the negative slice level –SL, the gate signal B-GATE is outputted. The peak signal PKS is the signal the polarity of which changes for each peak contained in the differentiation signal DF. The logic AND of these gate signals W-GATE, B-GATE and the peak signal PKS gives the edge signal WEG representing the edge of the white bar 14 and the edge signal BEG representing the edge of the black bar 15. These edge signals WEG and BEG discriminate the white bar and the black bar.

When the noise due to the roughness 18 (see FIG. 2) of the sheet surface 17 is great, the level of the differentiation signal DF is raised above the slice level SLL by the noise portions 46 and 47 of the differentiation signal DF. Then, the gate signals W-GATE and B-GATE are outputted at portions other than the edge portions of the bars 14 and 15. In consequence, portions not having the edges 14 and 15 are judged erroneously as the edges.

A way to prevent such influences of the noises might be a method that increases the slice level SLL. However, a new problem arises when the slice level SLL is increased. When a bar code with a small black-and-white difference (or having low contrast), that is called "LOW PCS", and a bar code having a small bar width in comparison with the beam, are scanned, for example, the amplitude of the electric signal of the output of the pin photodiode 16 becomes small. When such bar codes are read, the peak value $V_{DF}$ representing the edge of the bar of the differentiation signal DF becomes smaller at this time than the slice level SLL, in some cases, if the slice level is merely increased. Then, the problem develops in that the edge of the bar code cannot be detected even though the edge exists.

SUMMARY OF THE INVENTION

It is an object of the present invention to provide an optical code reader which, when a code is scanned with beams, can correctly binarize an electric signal and can reliably read the code even when noise is added to a reflected beam from the code, and even when the code has a small black-and-white difference, or even when the code has a small width.

The present invention is completed in order to accomplish the object described above.

In the optical code reader according to the present invention, a scanning mechanism scans the code to be read with beams, and reflected beams from the code are received by a beam receiving device, acquiring an electric signal. A differentiation unit differentiates the electric signal and outputs a differentiation signal. A slice level generation circuit is provided. This circuit generates a first slice level having a first ratio (slice ratio) which is constant with respect to the peak value of the differentiation signal and a second slice level having a second slice ratio which varies according to the peak value with respect to the peak value. The slice level generation circuit synthesizes the first and second slice ratios and outputs a synthetic slice level. A comparison unit compares the level of the differentiation signal with the synthetic slice level and outputs a binarized signal.

When the level of the differentiation signal becomes great in the present invention, the slice ratio of the slice level increases and approaches the peak value of the differentiation signal. Even if much noise is contained in the differentiation signal when the comparison circuit compares the level of the differentiation signal with the synthetic slice level, the level of the noise does not exceed the slice level because the slice level becomes high. Therefore, the judgement error of judging the noise as the edge of the code can be eliminated. When the level of the differentiation signal is small, the peak portion representing the edge of the differentiation signal can be made reliably greater than the slice level because the slice level is constant with respect to the peak value of the differentiation signal. Even when only a small differentiation signal can be obtained such as when a bar code has only a small black-and-white difference or when a bar code has a small bar width, the optical code reader according to the present invention can correctly binarize the code and can reliably read the code having a small black-and-white difference and the thin code even when the noise adds to the reflected beams from the code.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Hereinafter, preferred embodiments of the present invention will be explained with reference to the accompanying drawings.

Figure 4:
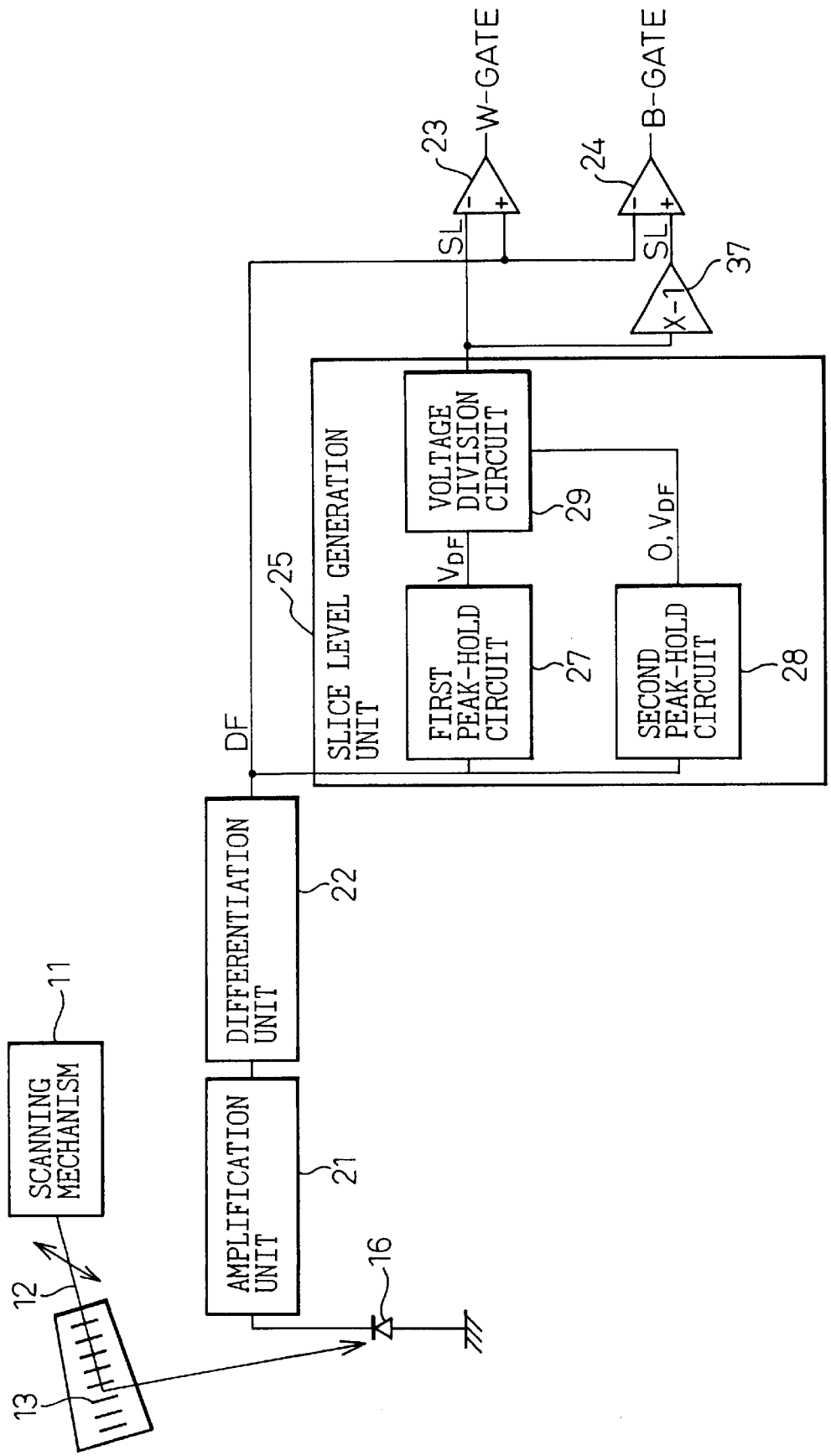
FIG. 4 is a block circuit diagram showing the construction of a circuit for executing a binarization process of a bar code reader to which the present invention is applied.

FIG. 4 shows a circuit portion for executing a binarization process inside circuits of a bar code reader to which the present invention is applied.

Figure 2:
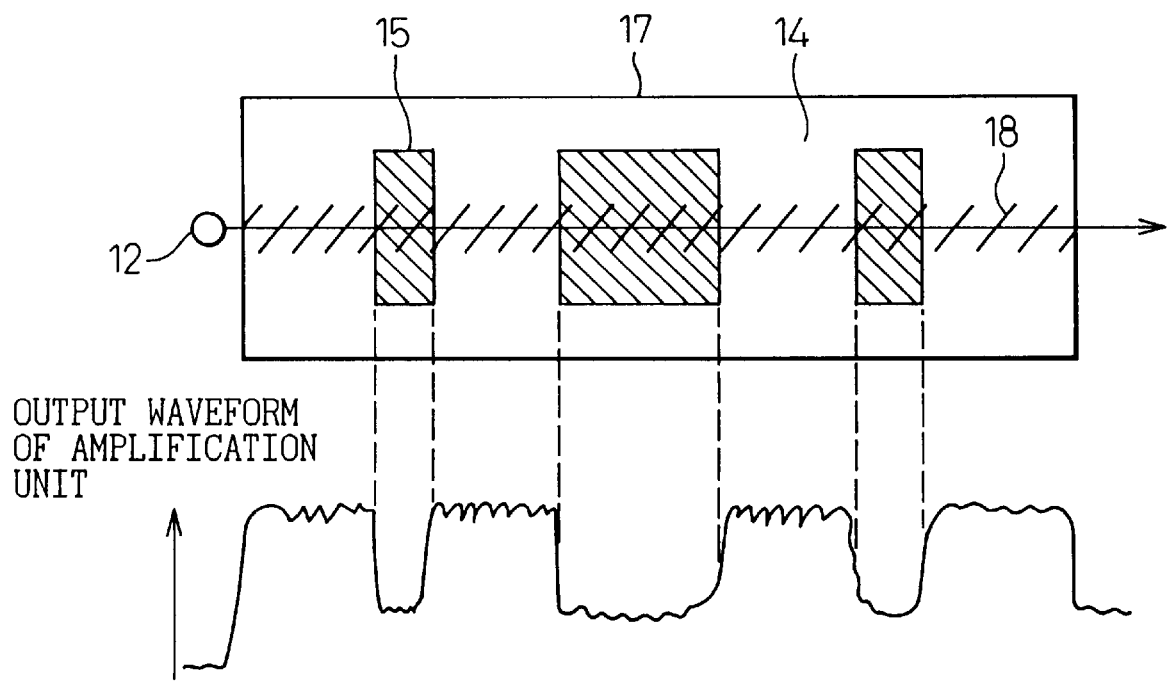
FIG. 2 is a waveform chart showing an output waveform of a pin photodiode shown in FIG. 1.

When a scanning mechanism 11 radiates laser beams 12 and scans a bar code 13, the reflected beams from the bar code 13 attain a high level when the beams 12 scan white bars 14 and a low level, when they scan black bars 15. Receiving the reflected beams from the bar code 13, a pin photodiode 16 outputs electric signals corresponding to the level of the reflected beams. The relationship between the bar code 13 and the electric signal as the output of the pin photodiode 16 has already been explained with reference to FIG. 2.

This electric signal is amplified by an amplifier unit 21 and is then inputted to a differentiation unit 22. The differentiation unit 22 outputs a differentiation signal DF obtained by differentiating the electric signal. The differentiation signal DF exhibits a large positive value when the beam 12 moves from the black bar 15 to the white bar 14, that is, when the edge of the white bar 14 is detected. It exhibits a large negative value when the beam 12 moves from the white bar 14 to the black bar 15, that is, when the edge of the black bar 15 is detected. The differentiation signal DF is inputted to comparison circuits 23 and 24 and to a slice level generation unit 25.

Figure 1:
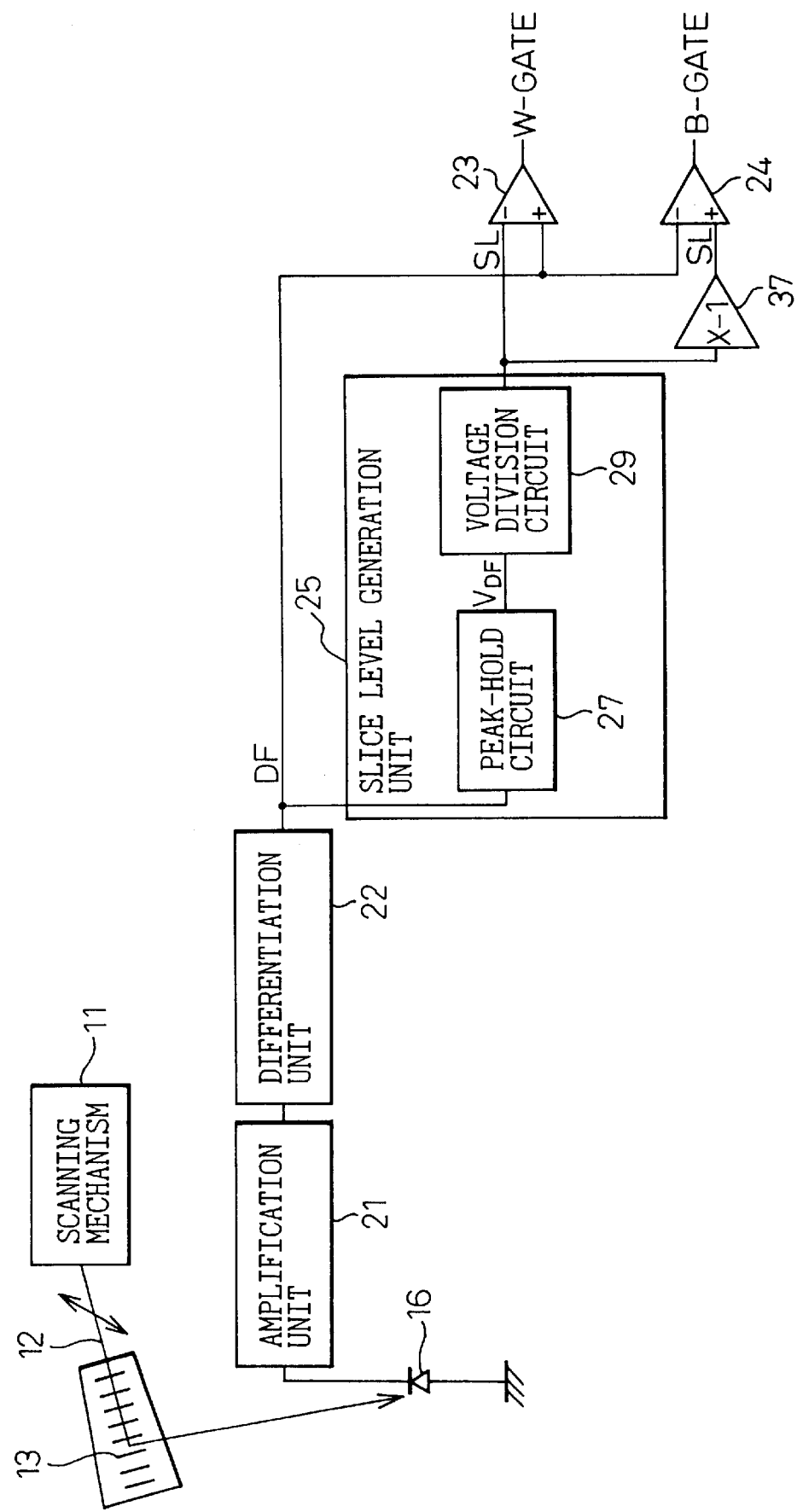
FIG. 1 is a block circuit diagram showing the construction of a circuit for executing a binarization process of a bar code reader according to the prior art.

The slice level generation unit 25 comprises a first peak-hold circuit 27, a second peak-hold circuit 28 and a voltage division circuit 29. The first peak-hold circuit 27 has the same construction as that of the peak-hold circuit 27 according to the prior art shown in FIG. 1, and holds the peak value $V_{DF}$ of the differentiation signal DF. The second peak-hold circuit 28 is invalid when the peak value $V_{DF}$ of the differentiation signal DF is small and holds the peak value $V_{DF}$ when this peak value $V_{DF}$ is large. The voltage division circuit 29 executes voltage division of the level of the output of the first peak-hold circuit 27, synthesizes the output with the output of the second peak-hold circuit 28, and outputs a slice level SLL.

The slice level generation unit 25 outputs the slice level SLL of a predetermined slice ratio SLR when the peak value $V_{DF}$ of the differentiation signal DF is small, and outputs a slice level SLL where the slice ratio SLR increases with the increase of the peak value $V_{DF}$ when the peak value $V_{DF}$ is large. The slice ratio SLR will be explained with reference to FIG. 5.

Figure 5:
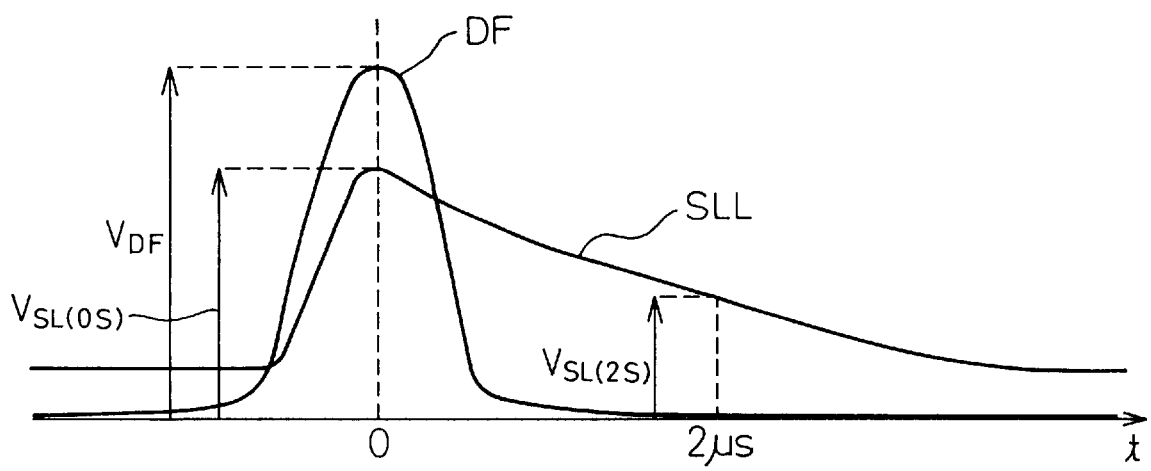
FIG. 5 is an explanatory view useful for explaining a slice ratio.

The abscissa in FIG. 5 represents the time t. When the differentiation signal DF changes with the passage of the time as shown in this drawing, the slice ratio SLR at the point of time 0S is $V_{SL(0S)}/V_{DF}$, assuming that the peak value at the peak (t=0S) of the differentiation signal DF is $V_{DF}$ and the slice level SLL is $V_{SL(OS)}$. Assuming also that the slice level SLL at the point (t=2 µS) after the passage of 2 µsec is $V_{SL(2S)}$, the slice level at the point 2 µS is $V_{SL(2S)}/V_{DF}$. That the slice ratio SLR is constant means that $V_{SL(OS)}/V_{DF}$ remains constant even when the peak value $V_{DF}$ fluctuates. That the slice level SLR increases with the increase of the peak value $V_{DF}$ means that the value VSL of the slice ratio approaches the level of the peak value $V_{DF}$ with the increase of the peak value $V_{DF}$.

Turning back to FIG. 4, the slice level SLL and the differentiation signal DF are inputted to the first comparison circuit 23. The slice level SLL, the polarity of which is inverted by an inverter 37, and the differentiation signal DF are inputted to the second comparison circuit 24. When the level of the differentiation signal DF exceeds the slice level SLL, the first comparison circuit 23 outputs a gate signal W-GATE. When the level of the differentiation signal DF exceeds the slice level SLL, the polarity of which is inverted by the inverter 37, the second comparison circuit 24 outputs a gate signal B-GATE.

Figure 6:
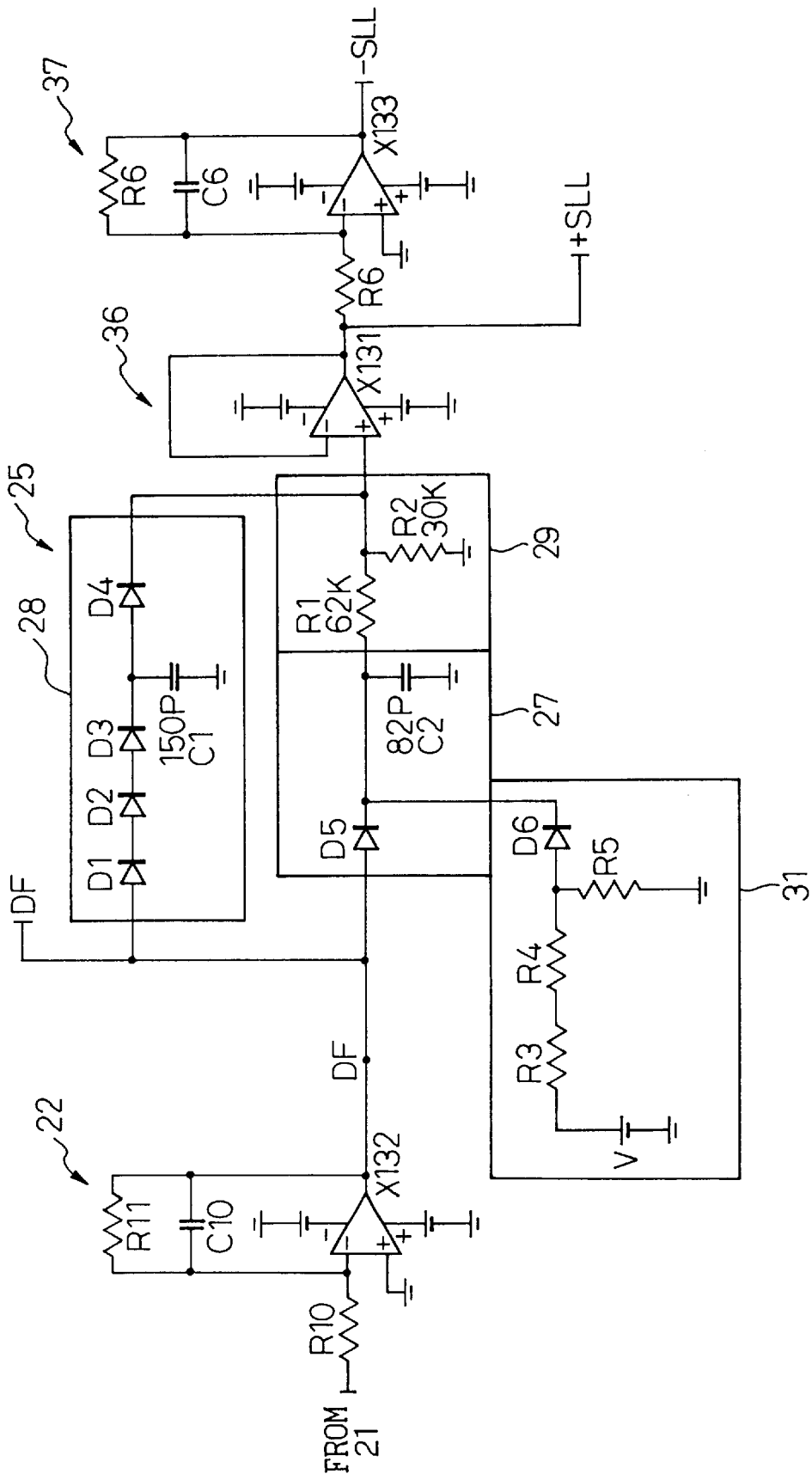
FIGS. 6 and 7 are circuit diagrams each showing in detail the circuit shown in FIG. 4.
Figure 7:
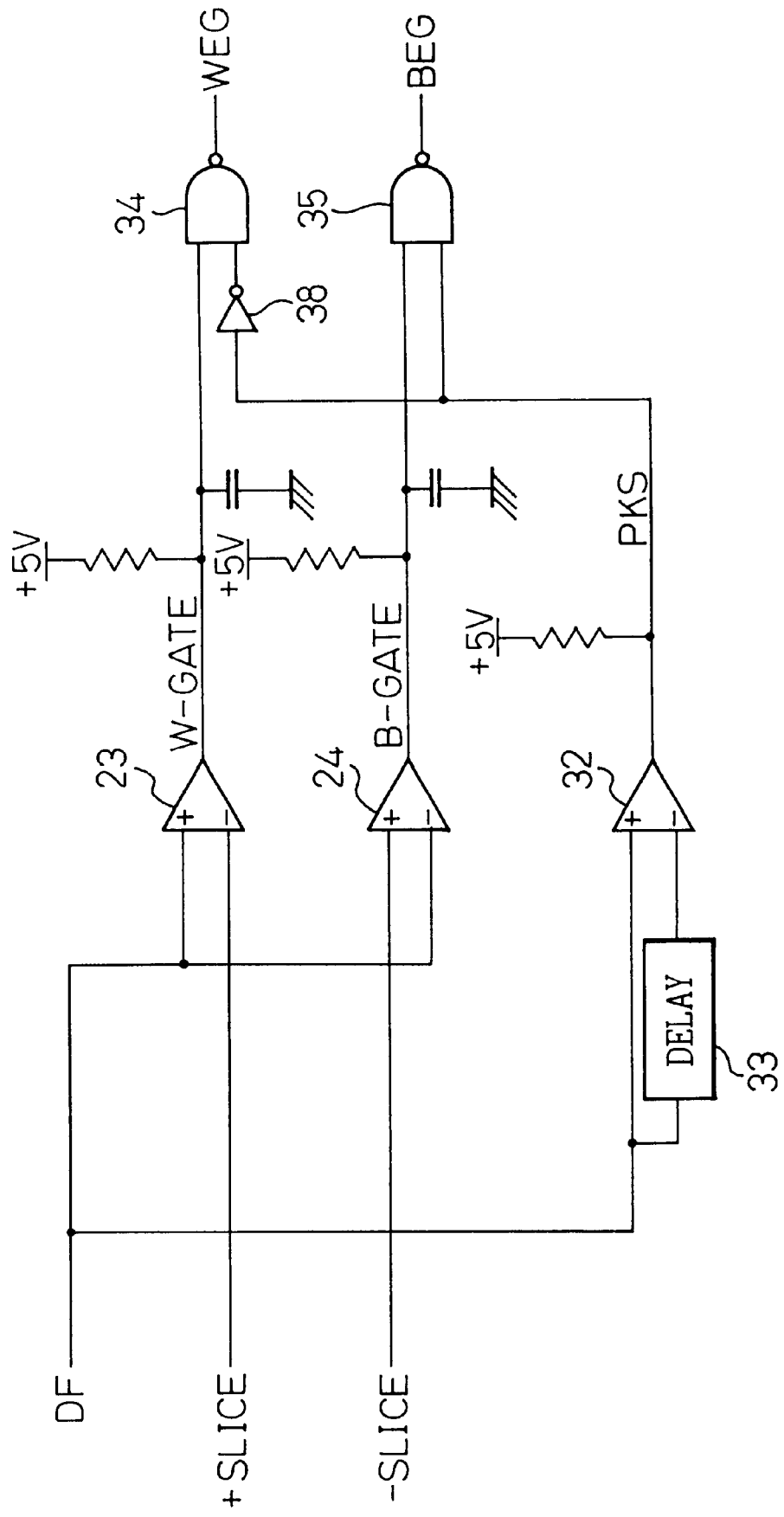

FIGS. 6 and 7 show in detail the circuit shown in FIG. 4.

The amplification unit is omitted from FIG. 6. The differentiation signal DF outputted by the differentiation unit 22 is inputted to the first peak-hold circuit 27 and the second peak-hold circuit 28 of the slice level generation unit 25.

As the differentiation signal DF is charged into a capacitor C2 through a diode D5, the first peak-hold circuit 27 holds the peak value. The voltage so charged is discharged by resistors R1 and R2. The time constant of the charge and discharge operations is determined by C2, R1 and R2. The resistors R1 and R2 constitute the voltage division circuit 29. A limiter level generation circuit 31 is connected to the input side of the first peak-hold circuit 27. The limiter level generation circuit 31 supplies a predetermined DC voltage to the capacitor C2. In consequence, even when the level of the differentiation signal DF drops remarkably, the voltage charged to the capacitor C2 can be held at a predetermined value or more. The first peak-hold circuit 27 generates a first slice level between the resistors R1 and R2.

In the second peak-hold circuit 28, on the other hand, the differentiation signal DF is charged into the capacitor C1 through three diodes D1, D2 and D3, and the peak value is held. The voltage level charged to the capacitor C1 becomes the second slice level outputted by the second peak-hold circuit 28 and is discharged by a diode D4 and the resistor R2 of the voltage division circuit 29. As the level of the differentiation signal DF becomes higher, the diodes D1, D2 and D3 become conductive and the capacitor C1 is charged. As the level of the differentiation signal DF becomes smaller, the diodes D1, D2 and D3 become non-conductive and the capacitor C1 is not charged. Consequently, the second peak-hold circuit 28 becomes substantially invalid. In this way, the level of the signal outputted by the second peak-hold circuit 28 changes in accordance with the peak value $V_{DF}$ of the inputted differentiation signal.

The signal appearing between the resistors R1 and R2 of the voltage division circuit 29 is outputted as the synthetic slice level SLL. This synthetic slice level preferentially comprises the first or second slice level that has a higher potential. The slice SLL passes through a buffer 36 and becomes a positive slice level +SLL. The output passing through the inverter 37 becomes a negative slice level −SLL.

The slice level +SLL is inputted to the negative terminal of the first comparison circuit 23. The differentiation signal DF is inputted to the positive terminal. The slice level −SLL is inputted to the positive terminal of the second comparison circuit 24. The differentiation signal DF is inputted to the negative terminal. When the level of the differentiation signal DF on the positive side exceeds the slice level +SLL, the first comparison circuit 23 outputs the gate signal W-GATE. When the level of the differentiation signal DF on the negative side exceeds the negative slice level −SLL, the second comparison circuit 24 outputs the gate signal B-GATE.

The differentiation signal DF is inputted to the positive terminal of the third comparison circuit 32 and is inputted to the negative terminal through the delay circuit 33. The third comparison circuit 32 outputs the positive signal while the differentiation signal DF rises and outputs the negative signal while the differentiation signal DF falls. In other words, the polarity of the output signal changes depending on the maximum and minimum values of the differentiation signal DF. This output signal is the peak signal PKS.

The gate signal W-GATE is inputted to a first gate circuit 34. The peak signal PK passing through the inverter 38 is inputted to the other terminal of the gate circuit 34. The gate signal W-GATE is the signal that is generated near the switching point from the black bar 15 to the white bar 14. Since the peak signal PK is the signal that represents the peak value, the first gate circuit 34 outputs the signal that is switched by the peak value of the differentiation signal DF, that is, the white edge signal WEG. The gate signal B-GATE is inputted to the second gate circuit 35. The peak signal PK is inputted to the other terminal of the gate circuit 35. The gate signal B-GATE is the signal that is outputted near the switching point from the white bar 14 to the black bar 15 and the peak signal PK is the signal that represents the peak value. Therefore, the second gate circuit 35 outputs the signal that is switched by the peak value of the differentiation signal DF, that is, the black edge signal BEG. As is obvious from the explanation given above, the edge signal WEG indicates that the white bar 14 of the bar code is detected. Similarly, the edge signal BEG represents that the black bar 15 of the bar code is detected.

Figure 8:
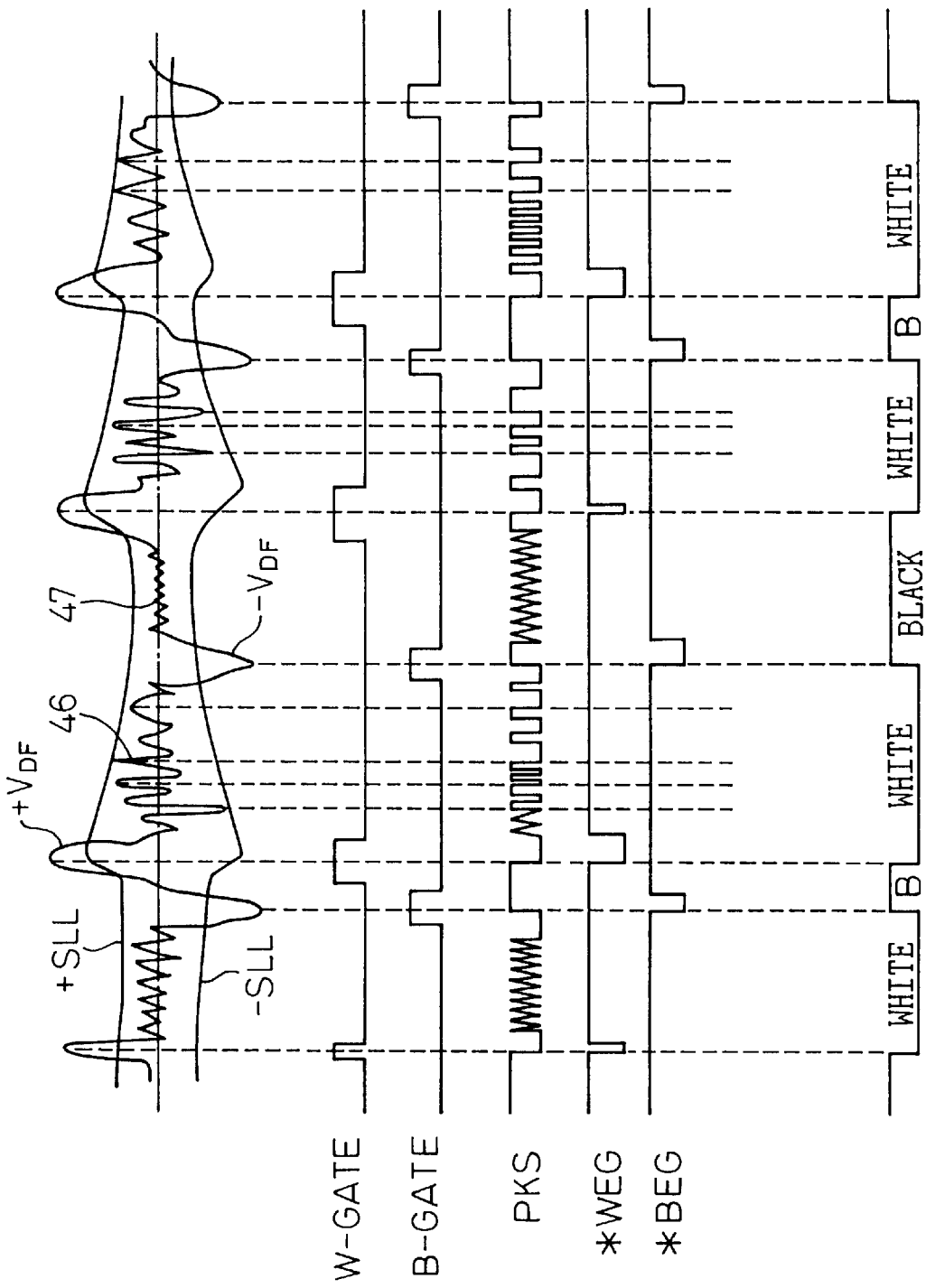
FIG. 8 is a waveform chart showing a signal waveform of each portion of the circuits shown in FIGS. 6 and 7.

FIG. 8 shows the signal waveform at each portion of the circuits shown in FIGS. 6 and 7.

The level of the differentiation signal DF greatly changes at the edge portion of the boundary between the white bar 14 and the black bar 15. Therefore, the differentiation signal DF exhibits a large peak value +$V_{DF}$ at the edge portion of the white bar 14 and a large peak value −$V_{DF}$ at the edge portion of the black bar 15. The differentiation signal DF contains noise components 46 and 47, too. Incidentally, the noise component 46 of the white bar 14 has a property such that it is smaller than the noise component 47 on the black bar 15.

The slice levels +SLL and −SLL are shown together with the differentiation signal DF. The ratio of slice level +SLL, −SLL to the peak value +$V_{DF}$, that is, a slice ratio SLR (see FIG. 5), changes in accordance with the peak value +$V_{DF}$. The slice ratio SLR will be explained with reference to FIGS. 9 and 10.

Figure 9:
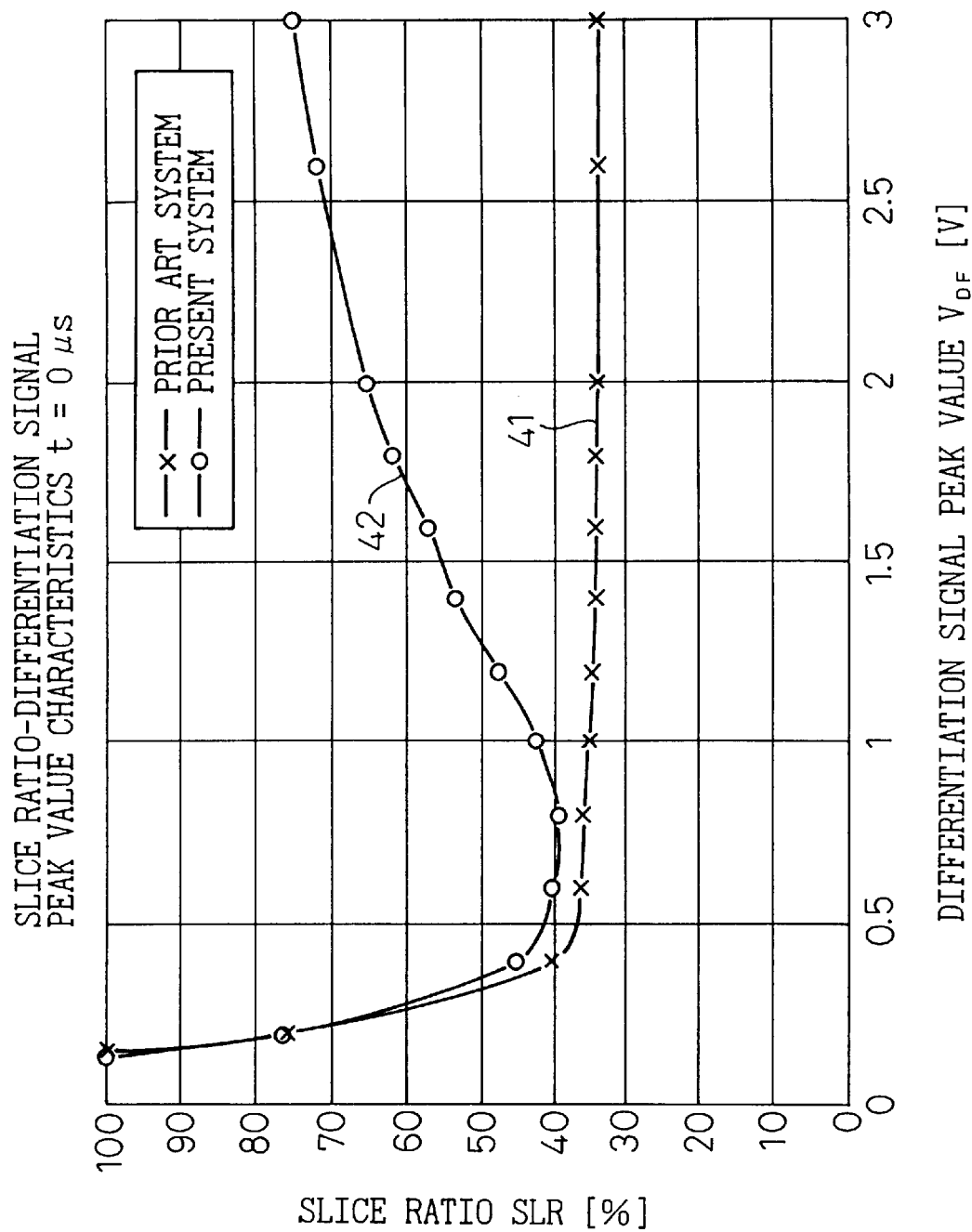
FIGS. 9 and 10 are graphs each showing the relationship between the slice ratio in the circuits shown in FIGS. 6 and 7 and a peak value of a differentiation signal DF.
Figure 10:
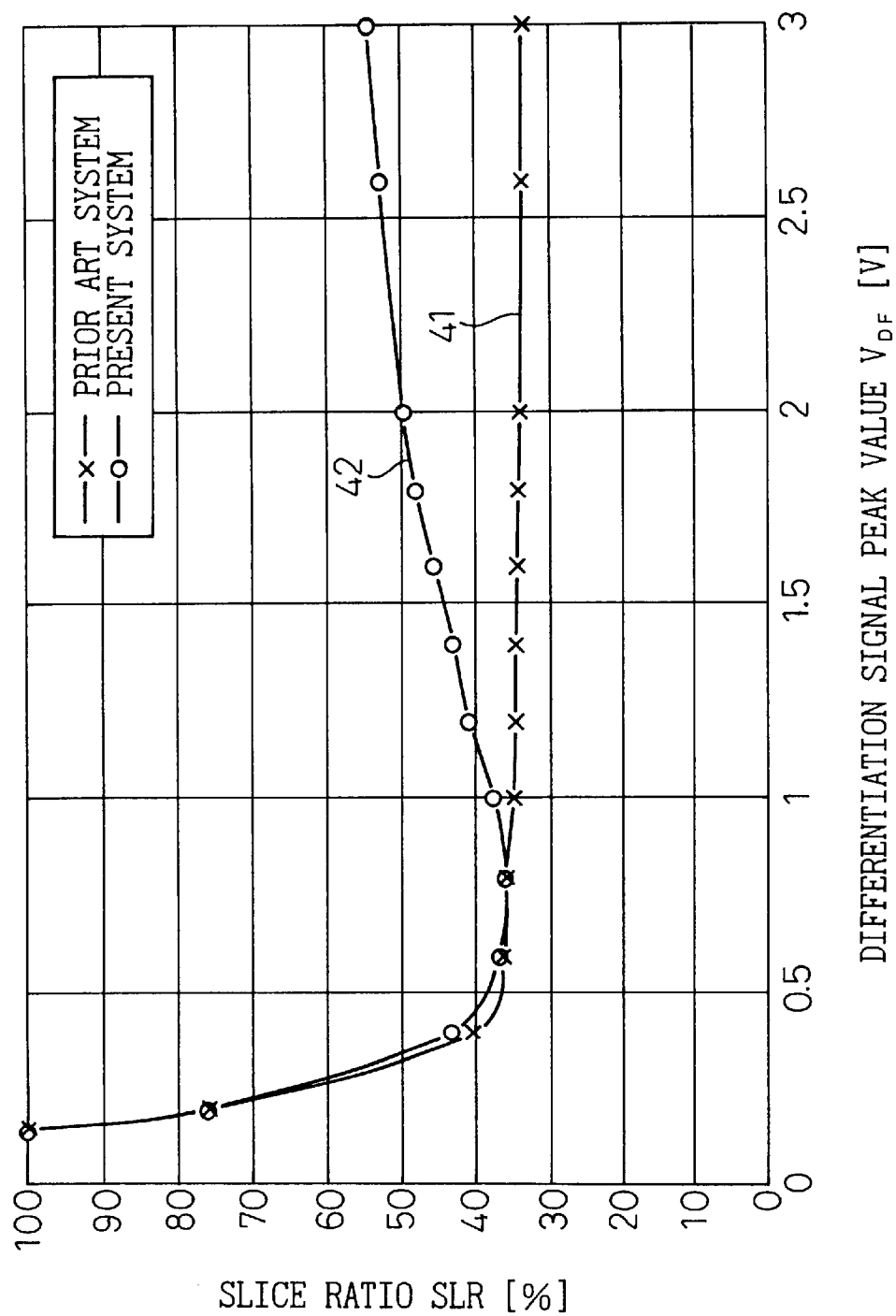

FIG. 9 shows the relationship between the peak value +$V_{DF}$ of the differentiation signal DF at the point 0S in FIG. 5 and the slice level SLL. FIG. 10 shows the relationship between them at the point 2 µs. In FIG. 9, a curve 41 represents the slice ratio characteristics according to the prior art and a curve 42 does the slice ratio characteristics in this embodiment. The slice ratio SLR in the prior art remains constant if the peak value +$V_{DF}$ of the differentiation signal DF is above a predetermined value. The slice ratio characteristics 42 in this embodiment increases with the increase of the peak value +$V_{DF}$ within the range in which the peak value $+V_{DF}$ is great. Consequently, when the peak value $+V_{DF}$ increases, the slice level SLL increases at an increment ratio greater than that of the peak value $+V_{DF}$ and approaches the peak value $+V_{DF}$. Incidentally, the slice level SLL is held at a predetermined value by the limiter level generation circuit 31 under the state where the peak value $+V_{DF}$ drops remarkably. In consequence, the slice ratio SLR increases in inverse proportion to the peak value $+V_{DF}$. As can be seen clearly from the characteristics shown in FIG. 10, the slice ratio 42 in this embodiment is greater than the slice ratio 41 having the predetermined value in the prior art even after the passage of the point 2 μS.

Figure 3:
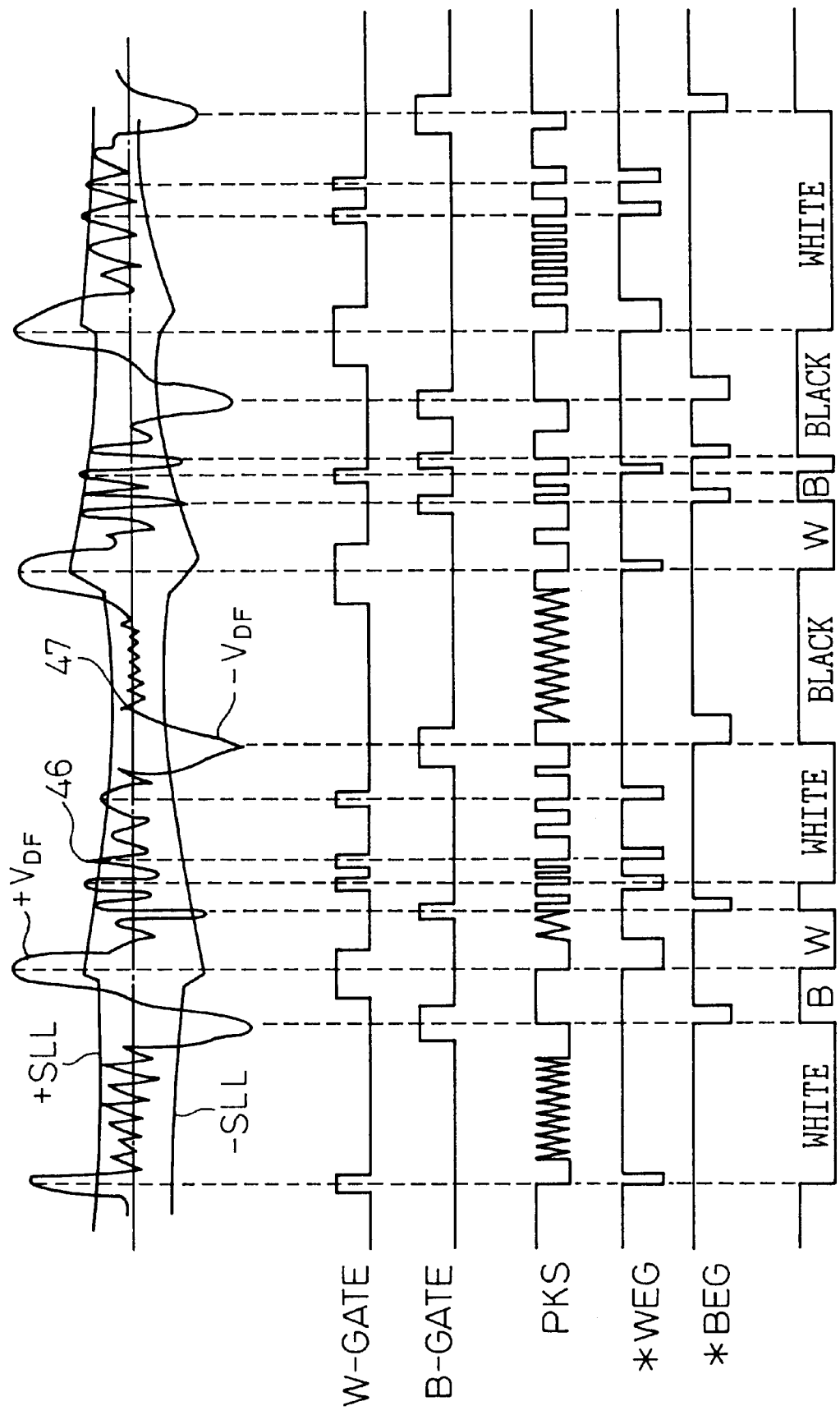
FIG. 3 is a waveform chart showing an output waveform of each portion in the circuit shown in FIG. 1.

The waveform chart of FIG. 8 shows the case where the level of the differentiation signal DF is great. In this case, the slice levels +SLL and −SLL approach the peak value $V_{DF}$ of the differentiation signal DF much more than the conventional slice level shown in the waveform chart of FIG. 3. Therefore, the noise components do not exceed the slice levels +SLL and −SLL. In consequence, the read error of the bar code 13 resulting from the noises can be eliminated. The slice level is attenuated. However, the noise 47 on the black bar 15 having a lower level appears after the noise 46 of the white bar 14 having a higher level, and the noise 47 can be thus prevented from exceeding the slice level SLL even when the slice level SLL attenuates.

While the level of the differentiation signal DF is higher than the slice level SLL, the gate signals W-GATE and B-GATE are outputted. If the peak signal PKS switches from 0 to 1 or vice versa while these gate signals W-GATE and B-GATE are outputted, the edge signals WEG and BEG are outputted at that point of time, respectively. Judgement of white and black is effected on the basis of the edge signals WEG and BEG.

Figure 11:
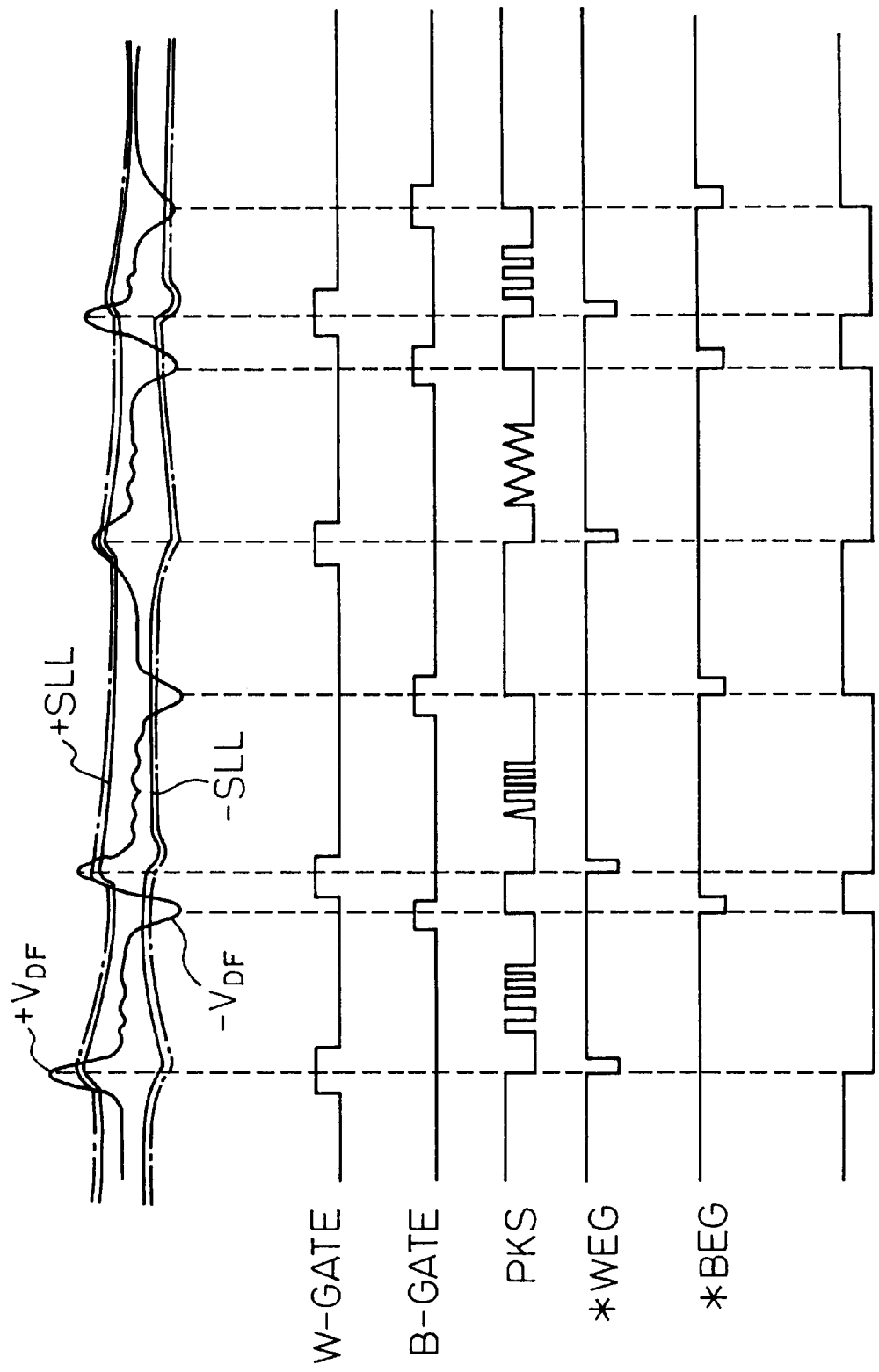
FIG. 11 is a waveform diagram showing the signal waveform of each portion of the circuits shown in FIGS. 6 and 7 when the level of the differentiation signal is low.

FIG. 11 shows the signal waveform at each portion of the circuits shown in FIGS. 6 and 7 when the level of the differentiation signal is low and when the noise level is low, too.

The level of the differentiation signal DF becomes lower than in the example shown in FIG. 8 when the black-and-white difference of the bar code 13 is not very large and when the width of the bar is small. In this case, the slice ratio SLR becomes lower with the drop of the peak value $V_{DF}$ of the differentiation signal DF as shown in FIG. 9. Therefore, since the slice level SLL becomes lower with respect to the peak value $+V_{DF}$, the peak value $+V_{DF}$ of the differentiation signal DF can be detected reliably.

As explained above, in the optical code reader according to this embodiment, the slice ratio SLR becomes large in the region where the level of the differentiation signal DF is great. Therefore, the recognition error of the bar code 13 due to the noise resulting from the ruggedness noise 18 of the sheet 17, on which the bar code 13 is printed, can be eliminated. In the region where the level of the differentiation signal DF is low, on the other hand, a lower slice level SLL than the peak value $+V_{DF}$ is generated in the same way as in the bar code readers according to the prior art. Therefore, the read operation of the bar code can be reliably executed even when the bar code has low contrast.

Incidentally, when the capacitors C1 and C2 among C1, R1, R2 and C1, C2, R1, R2, each being the factor for determining the time constants of the first and second peak-hold circuits 27 and 28 shown in FIG. 6, are independently adjusted, the discharge characteristics of the slice level SLL can be adjusted. The speed of discharge can be regulated when the value of the capacitor C2, in particular, is changed.

Figure 12:
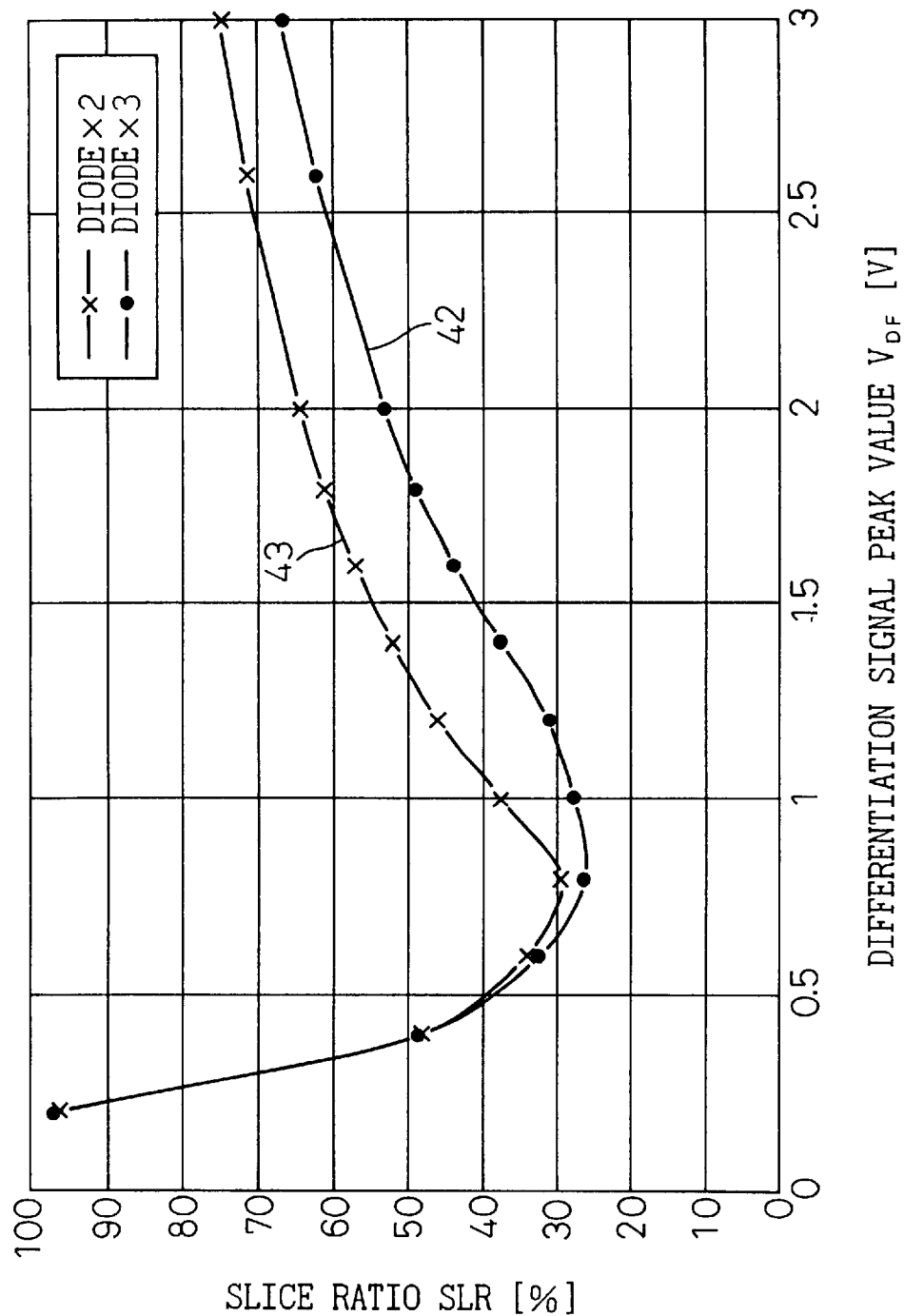
FIG. 12 is a graph showing a modified example of FIG. 9.

In the circuit shown in FIG. 6, three diodes D1, D2 and D3 are connected in series in the second peak-hold circuit 28. In this case, the slice level can be regulated depending on the number of diodes used. FIG. 12 shows the change of the slice ratio SLR with respect to the peak value $V_{DF}$ of the differentiation signal DF when the number of diodes is changed. A curve 42 represents the slice ratio SLR when three diodes are employed, and a curve 43 represents the slice ratio SLR when two diodes are used. As can be seen clearly from this graph, the slice ratio SLR becomes higher when two diodes are used than when three diodes are used. In other words, when the number of diodes increases, charging to the capacitor C1 of the second peak-hold circuit 31 cannot be started unless the peak value $V_{DF}$ of the differentiation signal DF becomes greater in such a fashion as to correspond to the increase of the number of diodes. If the peak value $V_{DF}$ is taken as the reference, therefore, the slice ratio SLR drops where the peak value $V_{DF}$ is great. On the contrary, when the number of diodes is decreased, the slice ratio SLR can be raised.

Figure 13:
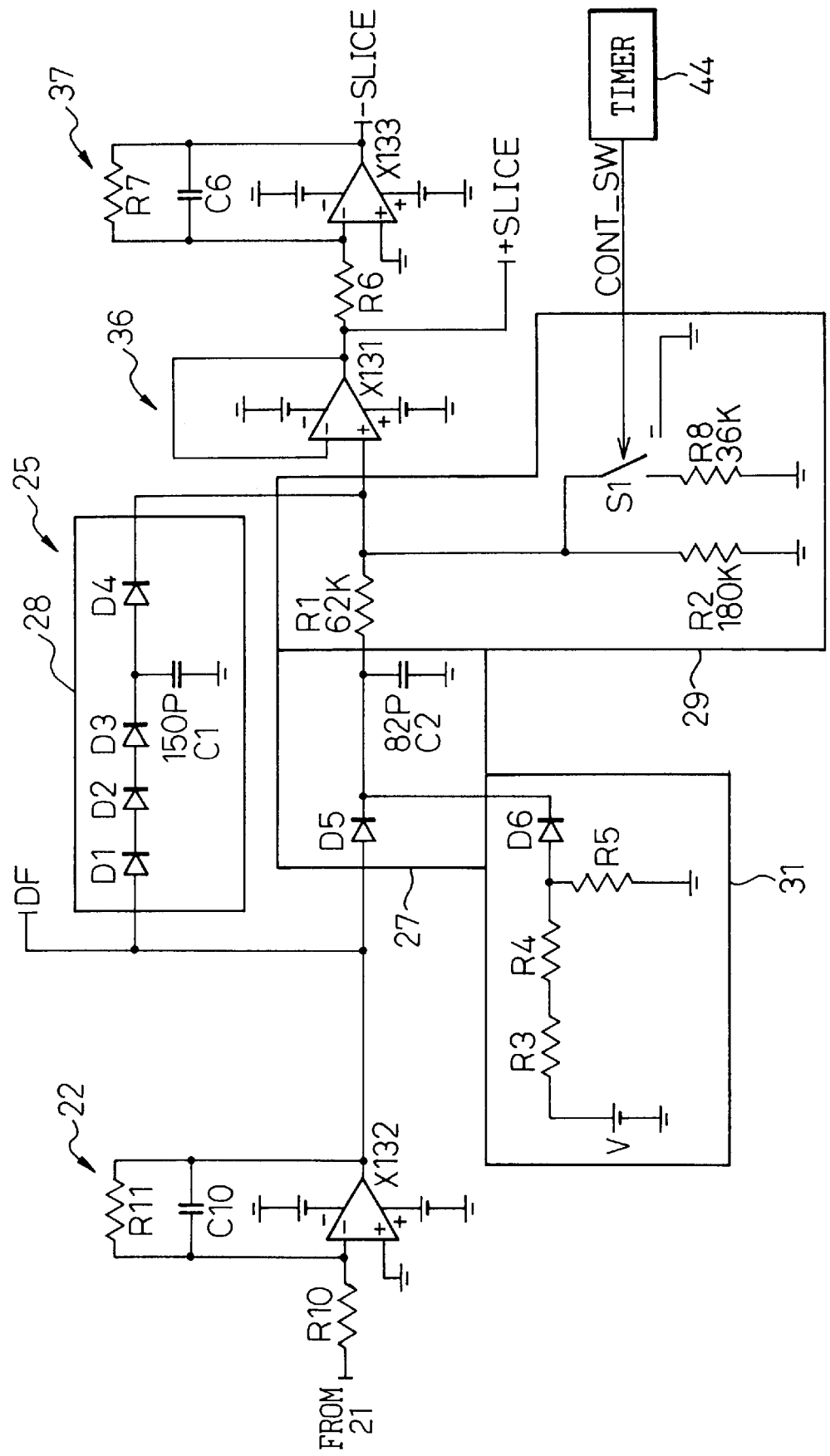
FIG. 13 is a circuit diagram showing a modified example of the circuit shown in FIG. 6.

FIG. 13 shows a modified example of the circuit shown in FIG. 6. The circuit shown in FIG. 13 is substantially in common with the circuit shown in FIG. 6. Therefore, explanation will be given on only different portions by omitting the explanation of the overlapping portions.

A resistor R8 is connected in parallel with the resistor R2 of the voltage division circuit 29 that determines the slice ratio SLR. A switch S1 is connected in series with this resistor R8. The switch S1 is turned ON and OFF by a control signal CONT-SW. If the synthetic resistance value of the resistors R2 and R8 when the switch S1 is ON is the same as that of the resistor R2 shown in FIG. 6, the resistor R8 is isolated when the switch S1 is OFF. Therefore, the voltage division ratio becomes high and the slice ratio rises. If the value of each resistor and each capacitor is as shown in the drawing, the slice ratio SLR is 32.7% when the switch is ON and is 74.4% when the switch is OFF.

The switch S1 is periodically set ON and OFF by a timer 44. In consequence, the slice ratio SLR changes in a predetermined cycle. When the optimum slice ratio SLR is attained, the bar code 13 can be accurately recognized. One of the scanning mechanisms 11 rotates a polygon mirror by a polygon motor and repeats scanning by the beams 12. The slice ratio SLR may be switched as the switch S1 is turned ON and OFF in synchronism with the revolution of this polygon motor.

Figure 14:
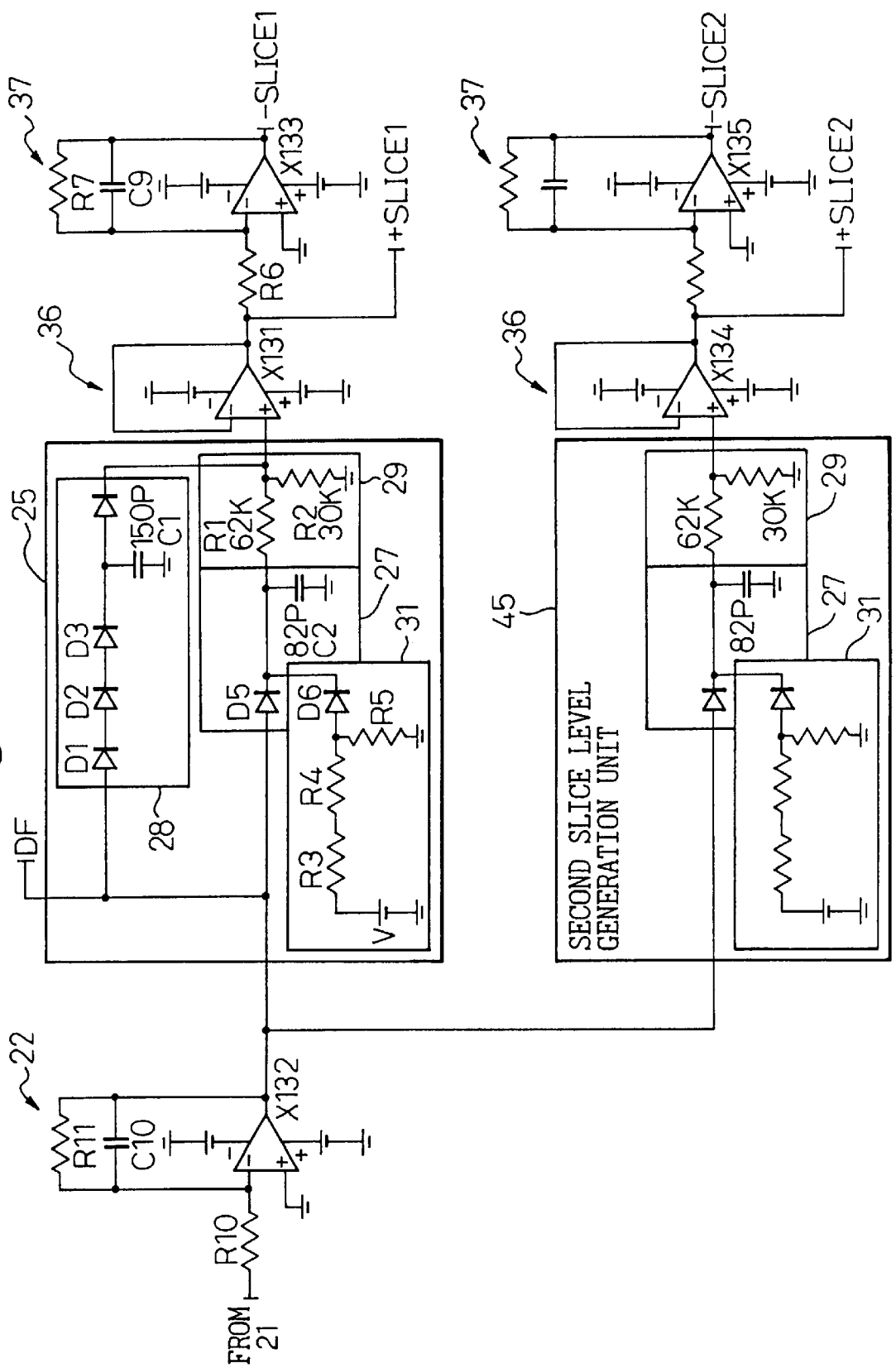
FIG. 14 is a circuit diagram showing another modified example of the circuit shown in FIG. 6.

FIG. 14 shows another modified example of the circuit shown in FIG. 6. In this modified example, too, explanation will be given on only the portions different from the circuit shown in FIG. 6.

The circuit shown in FIG. 14 is provided with two series of the slice level generation circuits and the circuits subsequent to the former. The output of the differentiation unit 22 is distributed to the first slice level generation unit 25 and the second slice level generation unit 45. The first slice level generation unit 25 has exactly the same construction as that of the slice level generation unit 25 shown in FIG. 6. The second slice level generation unit 45 comprises the limiter level generation circuit 31, the voltage division circuit 29 and the first peak-hold circuit 27, but the second peak-hold circuit 28 is omitted. Therefore, the second slice level generation unit 45 has the slice ratio that is constant.

If the sheet noise is high when the circuit shown in FIG. 14 is used, the first slice level generation unit 25 is used. When the sheet noise is small, the second slice level generation unit 45 is used. Therefore, the bar code can be read reliably irrespective of the sheet condition. Each capacitor and each resistor of the first peak-hold circuit 27 of the first slice level generation unit 25 may have the same as, or different from, the value of each capacitor and each resistor of the first peak-hold circuit 28 of the second slice level generation unit 45.

The optical code reader according to the present invention has thus been explained about its application to the bar code reader. However, the optical code reader according to the present invention can be also applied to an image scanner, an OCR and a FAX. Additionally, the binarization circuit described above is effective for not only the optical code reader but also for ordinary binarization circuits.

What is claimed is:

1. An optical code reader comprising:

a scanning mechanism for radiating beams for scanning a code to be read;

a beam receiving element for receiving reflected beams from a scanned object and outputting an electric signal;

a differentiation unit for differentiating said electric signal and outputting a differentiation signal;

a slice level generation unit for outputting a slice level which is made by synthesizing a first slice level and a second slice level, said first slice level having a first slice ratio which is constant with respect to a peak value of an amplitude of said differentiation signal and said second slice level having a second slice ratio, which varies according to said peak value, with respect to said peak value, where first and second slice ratios are ratios between a slice level and said differentiation signal; and a comparison unit for comparing the level of said differentiation signal with said synthetic slice level and outputting a binarized signal.

2. An optical code reader according to claim 1, wherein said comparison unit includes a first comparison circuit for comparing said synthetic slice level with a level of said differentiation signal as a slice level on a positive side, and a second comparison circuit for comparing a signal value, which is acquired by inverting said synthetic slice level, with a slice level on a negative side.

3. An optical code reader according to claim 1, further comprising:

a limiter level generation circuit for supplying a voltage of a predetermined level to an input of said first slice level generation circuit.

4. An optical code reader according to claim 1, wherein said slice level generation unit comprises:

a first slice level generation circuit comprising a peak-hold circuit for holding the peak value of the amplitude of said differentiation signal and a voltage division circuit for executing voltage division of said peak value; and a second peak-hold circuit for inputting said differentiation signal through a plurality of diodes.

5. An optical code reader according to claim 4, wherein a voltage division ratio of said voltage division circuit is variable, and which further includes a switch for changing said voltage division ratio.

6. An optical code reader according to claim 5, which further comprises means for periodically switching said switch.

7. A bar code reader including said optical code reader according to claim 1.

8. An optical reader according to claim 2, wherein said comparison unit includes:

a peak detection circuit for detecting the peak appearing in the amplitude of said differentiation signal;

a gate circuit for calculating AND between an output of said first comparison circuit and said peak detection circuit; and another gate circuit for calculating AND between an output of said second comparison circuit said peak detection circuit.

9. An optical code reader according to claim 2, further comprising:

a second slice level generation unit for outputting a third slice level having a constant slice ratio with respect to the peak value of the amplitude of said differentiation signal; and a third comparison circuit for comparing the level of said differentiation signal with said third slice level.

10. An optical code reader according to claim 9 further comprising a limiter level generation circuit for supplying a voltage having a constant level to the input of said first slice level generation unit.

11. An optical code reader comprising:

a scanning mechanism for radiating beams for scanning a code to be read;

a beam receiving element for receiving reflected beams for a scanned object and outputting an electric signal;

a differentiation unit for differentiating said electric signal and outputting a differentiation signal;

a slice level generation unit for outputting a slice level according to a first slice level and a second slice level, said first slice level having a first slice ratio which is constant with respect to a peak value of an amplitude of said differentiation signal and said second slice level having a second slice ratio, which varies according to said peak value, with respect to said peak value, where first and second slice ratios are ratios between a slice level and said differentiation signal; and a comparison unit for comparing the level of said differentiation signal with said slice level and outputting a binarized signal.

12. A binarization circuit comprising:

a differentiation unit for differentiating an electric signal inputted thereto, and outputting a differentiation signal;

a slice level generation circuit for outputting a synthetic slice level which is made by synthesizing a first slice level and a second slice level, said first slice level having a first slice ratio which is constant with respect to the peak value of an amplitude of said differential signal and said second slice level having a second slice ratio which varies according to said peak value, with respect to the peak value, where first and second slice ratios are ratios between a slice level and said differentiation signal; and a comparison unit for comparing a level of said differentiation signal with said synthetic slice level, and outputting a binarized signal.

* * * * *